United States Patent
Klosk

(10) Patent No.: US 8,083,113 B2
(45) Date of Patent: Dec. 27, 2011

(54) WATERPROOF PORTABLE SECURITY ENCLOSURE ASSEMBLY

(75) Inventor: Steven Klosk, New York, NY (US)

(73) Assignee: SRK Consulting Group, New York, NY (US)

(*) Notice: Subject to any disclaimer, the term of this patent is extended or adjusted under 35 U.S.C. 154(b) by 782 days.

(21) Appl. No.: 12/154,932

(22) Filed: May 28, 2008

(65) Prior Publication Data

US 2008/0296331 A1 Dec. 4, 2008

Related U.S. Application Data

(60) Provisional application No. 60/932,331, filed on May 29, 2007.

(51) Int. Cl.
*B60R 7/02* (2006.01)

(52) U.S. Cl. ......... 224/539; 224/545; 224/547; 224/912

(58) Field of Classification Search ................. 224/484, 224/485, 539, 544, 545, 547, 548, 555, 911–913; 109/50–52; 211/64; 312/351.1, 111; 248/551, 248/220.41, 220.21, 224.8, 346.03, 346.01; 70/58, 63

See application file for complete search history.

(56) References Cited

U.S. PATENT DOCUMENTS

| | | | |
|---|---|---|---|
| 3,330,611 A | 7/1967 | Heifetz | |
| 4,531,774 A * | 7/1985 | Whatley | 296/37.6 |
| 4,613,109 A * | 9/1986 | Boscacci | 248/553 |
| 4,951,577 A * | 8/1990 | Bentley | 109/51 |
| 5,415,333 A | 5/1995 | Wills | |
| 5,778,805 A | 7/1998 | Green | |
| 5,870,910 A | 2/1999 | Specht | |
| 6,082,272 A | 7/2000 | Adrain | |
| 6,145,719 A | 11/2000 | Robert | |
| 6,375,054 B1 | 4/2002 | Lance et al. | |
| 6,401,994 B1 | 6/2002 | Ham et al. | |
| 6,523,800 B2 * | 2/2003 | Hsu | 248/499 |
| 6,726,074 B2 | 4/2004 | Boys | |
| 2007/0046057 A1 | 3/2007 | Howard | |

* cited by examiner

*Primary Examiner* — Justin M Larson
*Assistant Examiner* — Adam Waggenspack
(74) *Attorney, Agent, or Firm* — Robert L. Epstein; Epstein Drangel LLP

(57) ABSTRACT

A portable security enclosure assembly is provided for use with a vehicle of the type having a surface. The enclosure includes a base and means for fixing the base to the vehicle surface. Means are provided for detachably mounting the enclosure to the base. The mounting means includes first and second rings pivotally mounted on the base surface for movement between an upright position and a non-upright position. The rings are spaced apart. The enclosure has first and second openings adapted to align with the rings, respectively, when the enclosure is situated on the base, such that the rings extend through the openings in the enclosure when the rings are in the upright position. A locking bar, longer than the distance between the rings, is adapted to be simultaneously received through the rings, so as to secure the enclosure to the base.

21 Claims, 5 Drawing Sheets

WATERPROOF PORTABLE SECURITY ENCLOSURE ASSEMBLY

CROSS-REFERENCE TO RELATED APPLICATIONS

Applicant claims priority on Provisional Patent Application Ser. No. 60/932,331, filed May 29, 2007.

STATEMENT REGARDING FEDERALLY SPONSORED RESEARCH OR DEVELOPMENT

Not Applicable

REFERENCE TO A "SEQUENCE LISTING", A TABLE, OR A COMPUTER PROGRAM LISTING APPENDIX SUBMITTED ON COMPACT DISC

Not Applicable

BACKGROUND OF THE INVENTION

1. Field of the Invention

The present invention relates to security enclosures and more particularly to a waterproof and portable security enclosure and base retention system.

2. Description of Prior Art Including Information Disclosed Under 37 CFR 1.97 and 1.98

Field agents employed by government agencies such as the FBI and the ATF, or those employed in the private sector for SWAT teams and security firms, have long faced the challenge of securing and storing weaponry in their transport vehicle while on assignment. Typically, heavy rifles and light automatic weapons have been bagged and stowed in the rear of a vehicle such as a large S W, necessitating vigilance on the part of an agent assigned to secure the vehicle. Optionally, all weaponry must be removed and transported by the agents after exiting the vehicle, possibly compromising the agents' security and identities.

In addition, a merchant who transports sums of cash or precious commodities within his vehicle places himself and his cargo at risk. The threat of robbery of his unsecured valuables is a constant concern.

Contractors and home-improvement specialists employ heavy and bulky tools, typically locked within a van during off-hours. These tools are desirable and readily stolen when the vehicle locks are defeated.

The aforesaid creates a dangerous situation for government agents, merchants, contractors, and the public. My invention presents an effective solution to the problem.

BRIEF SUMMARY OF THE INVENTION

It is therefore, a prime object of the present invention to provide a waterproof portable security enclosure assembly.

It is another object of the present invention to provide a waterproof portable security enclosure assembly that can be detachably mounted to a vehicle by means of a base retention system.

It is another object of the present invention to provide a waterproof portable security enclosure assembly that is detachably mounted to a vehicle using spaced, pivotally mounted rings which when in the upright position accept a steel bar.

It is another object of the present invention to provide a waterproof portable security enclosure assembly that is detachably mounted to a vehicle by rings that extend through openings in the surface of the enclosure.

It is another object of the present invention to provide a waterproof portable security enclosure assembly that is detachably mounted to a vehicle by rings that extend through openings in the enclosure and wherein the openings have covers for use when the enclosure is removed from the vehicle.

It is another object of the present invention to provide a waterproof portable security enclosure assembly that can be detachably mounted to a vehicle in either a horizontal or a vertical position.

It is another object of the present invention to provide a waterproof portable security enclosure assembly that has a segmented or roll-up access door.

It is another object of the present invention to provide a waterproof portable security enclosure assembly that includes one or more rack members adapted to mount one or more firearm containment pods.

It is another object of the present invention to provide a waterproof portable security enclosure assembly that has a retractable handle and wheels for moving the enclosure when it is removed from the vehicle.

It is another object of the present invention to provide a waterproof portable security enclosure assembly that has a bumper such that the enclosure can stand upright. The above objects are achieved by the present invention which includes the following aspects.

In accordance with one aspect of the present invention, a portable security enclosure assembly is provided for use with a vehicle of the type having a surface. The enclosure includes a base and means for fixing the base to the vehicle surface. Means are provided for detachably mounting the enclosure to the base. The mounting means includes first and second rings pivotally mounted on the base surface for movement between an upright position and a non-upright position. The rings are spaced apart. The enclosure has first and second openings adapted to align with the rings, respectively, when the enclosure is situated on the base, such that the rings extend through the openings in the enclosure when the rings are in the upright position. A locking bar, longer than the distance between the rings, is adapted to be simultaneously received through the rings, so as to secure the enclosure to the base.

The enclosure includes means for covering the openings in the enclosure when the enclosure is removed from the base.

The means for fixing the base to the vehicle surface take the form of a plurality of spaced bolts.

The enclosure includes first and second wheels mounted to one side of the enclosure and a handle mounted on another side of the enclosure. The wheels and handle are situated on opposite sides of the enclosure. Preferably, the handle is retractable.

A bumper is mounted to the side of the enclosure with the wheels. The enclosure is adapted to stand upright on the wheels and bumper when it is removed from the vehicle.

The enclosure also includes a rack member, a firearm containment pod and means for detachably mounting the pod on the rack member.

In accordance with another aspect of the present invention, a security enclosure assembly is provided for use with a vehicle. The enclosure includes first and second opposing surfaces. Means are provided for affixing one of the enclosure surfaces to the vehicle. A door is situated in the other of the enclosure surfaces to permit access to the interior of the enclosure. Means are provided for locking the door in the closed position. A first rack member is mounted on and extends from the enclosure surface that is affixed to the vehicle and into the interior of the enclosure. A firearm containment pod is provided, as is means for detachably mounting the pod to the first rack member.

The pod mounting means includes a pin and a pin-receiving recess.

The pod has an open end and a cover for the open end.

The enclosure also includes a second rack member, mounted on and extending from the enclosure surface affixed to the vehicle, at a location spaced from the first rack member.

The enclosure also has a second means for detachably mounting the pod on the second rack member. The second mounting means includes a pin and a pin-receiving recess.

The enclosure has a second firearm containment pod. The second pod has an open end and a cover for the open end.

The pod is adapted to hold a pistol.

The second pod is adapted to hold a rifle.

The enclosure further includes a pod adapted to hold medical supplies.

The door is segmented and may be a roll-up door.

BRIEF DESCRIPTION OF SEVERAL VIEWS OF THE DRAWINGS

To these and to such other objects that may hereinafter appears, the present invention relates to a waterproof and portable security enclosure and base retention system as described in detail in the following specification and recited in the annexed claims, taken together with the accompanying drawings, in which like numerals refer to like parts and in which:

DETAILED DESCRIPTION OF THE INVENTION

The specification which follows, together with the accompanying drawing, discloses a preferred embodiment of the present invention and should not be construed as limiting the invention to the particular example shown and described, as those skilled in the art will understand that many variations based on my invention could be made which fall within the scope of the invention.

Figure 1:
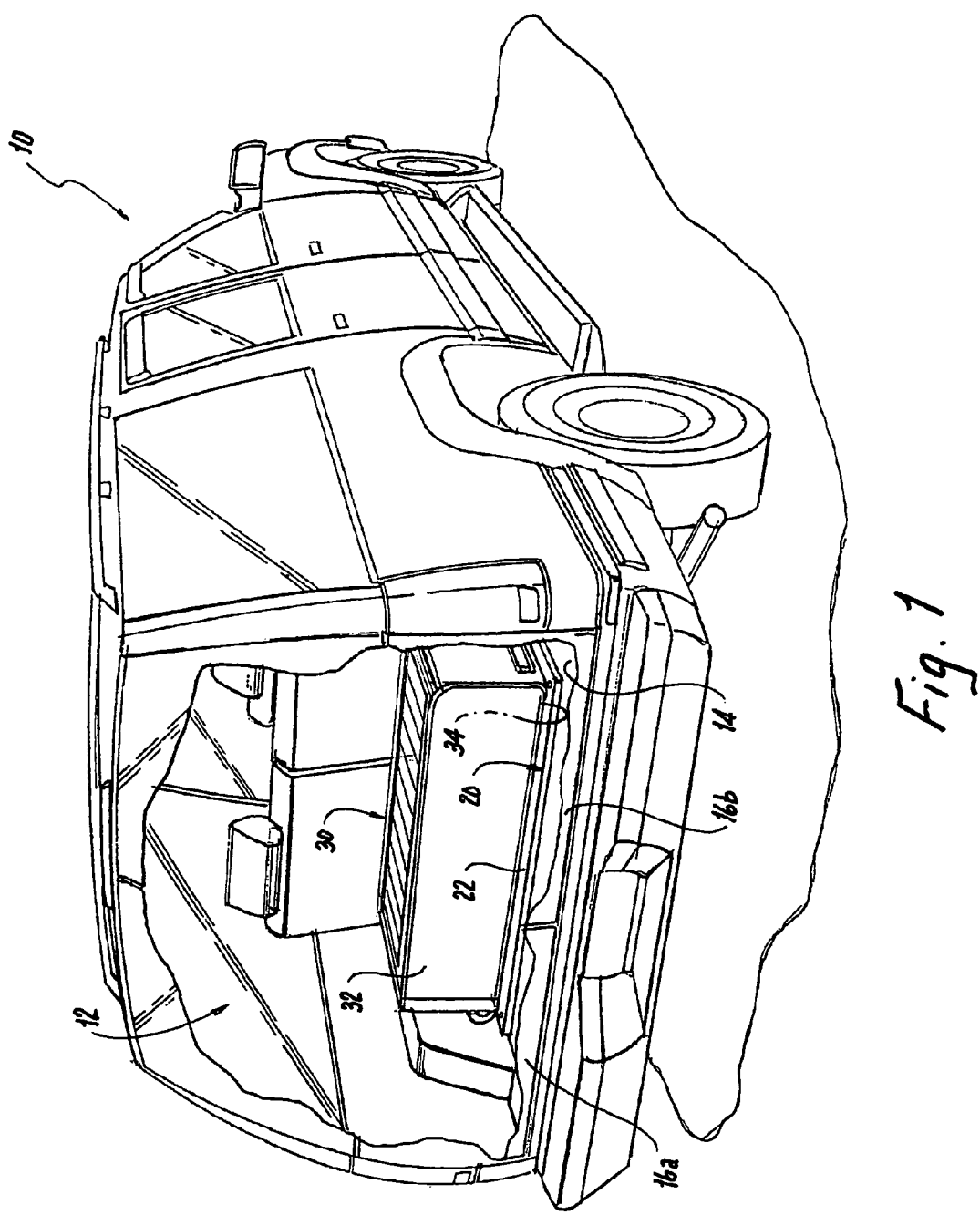
FIG. 1 is a perspective, partial cutaway view of a transport vehicle, containing the preferred embodiment of the portable enclosure therein.

FIG. 1 illustrates a vehicle 10 which is shown in partial cutaway. The interior compartment 12 of the vehicle is visible, along the floor pan 14. Floor pan 14 is formed of sheet metal, and is typically covered by insulation and carpet. Access to compartment 12 is generally achieved by opening rear doors 16a and 16b.

Visible within the compartment 12 is base platform 20, and portable enclosure 30. Enclosure body 32 is shown installed and affixed to the upper surface 22 of base 20. Enclosure body 32 includes lower surface 34 which is in a face-to-face relation with upper surface 22 of base 20.

Figures 2, 2A:
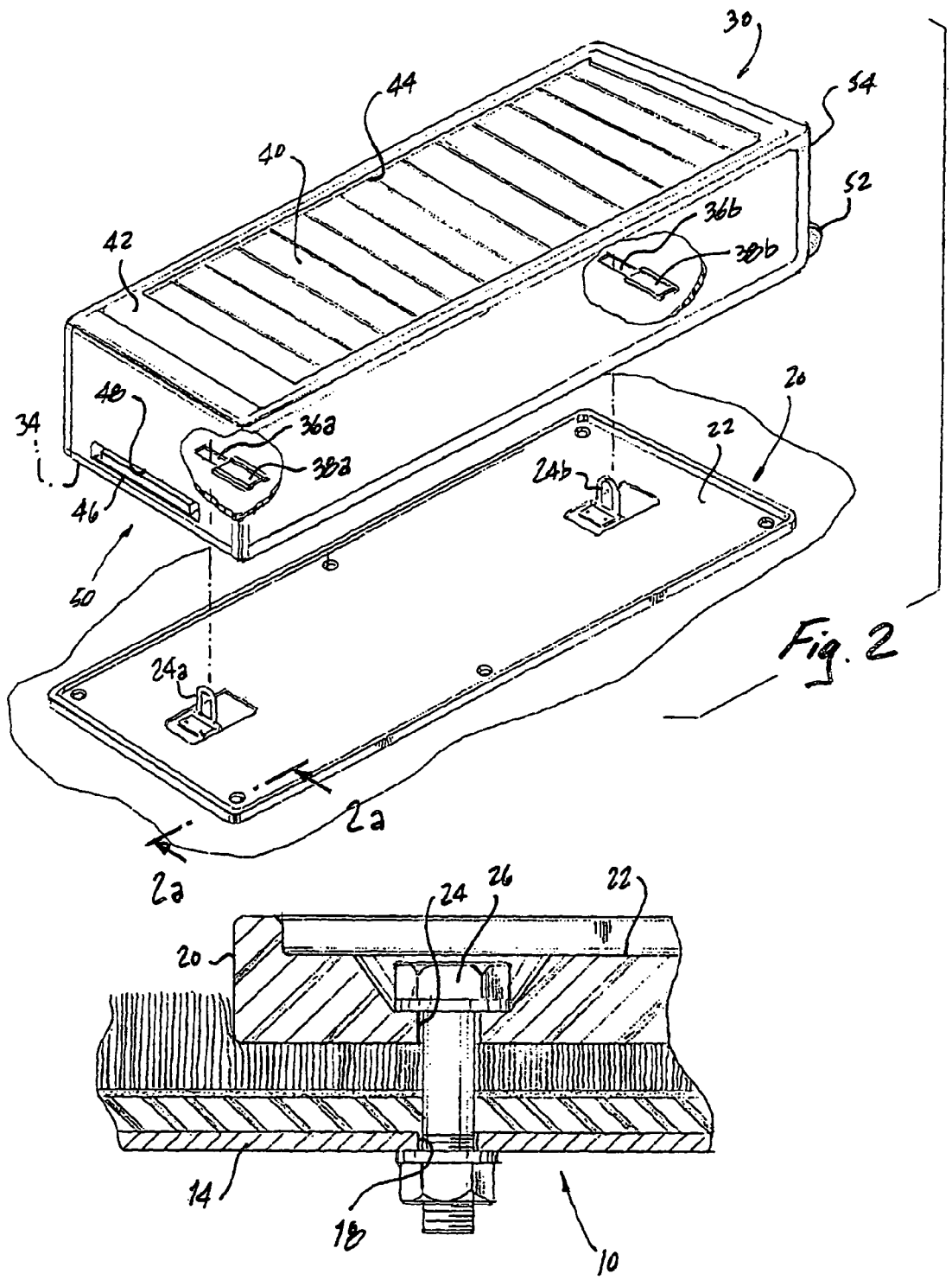
FIG. 2 is an exploded perspective view of the enclosure and base platform of FIG. 1.
FIG. 2a is a sectional elevation view taken along line 2a-2a of FIG. 2, showing the retention means of the base platform to the vehicle.

In FIG. 2, enclosure 30 is shown spaced from base 20, revealing the details of upper surface 22. As seen through the cutaway wall, lower most surface 34 contains rectangular openings 36a and 36b, revealed by sliding closure means, cover panels 38a and 38b, out of alignment with openings 36a and 36b. Openings 36a and 36b are dimensioned to receive pivotal rings 24a and 24b, each of which is affixed to a piano hinge mounted to upper surface 22. As seen in this view, the rings are placed in an upright position for insertion into the openings 36a and 36b.

Enclosure 30 has a roll-up or segmented door 40 on top surface 42. It is contemplated that the integrity of door 40 is not easily compromised, and that door 40 is lockable via mechanical or electronic means. Door 40 may also be opened and closed via mechanized means, such as by a motor driven roller. It also is desirable that the interface between door 40 and enclosure 30 be water-proofed, such as by the installation of a rubber O-ring, which may bound the periphery of enclosure opening 44. This water-proofing provides buoyancy for enclosure 30, should the enclosure be utilized in a marine environment. Handle 46 is accessible at rectangular opening 48 of front end 50 of enclosure 30. A plurality of wheels 52 is disposed at rear end 54 of enclosure 30.

The interface between base 20 and floor pan 14 is shown in FIG. 2a. Platform 20 contains a plurality of through bores 24. Bores 24 are placed in alignment with apertures 18 of the floor pan, and bolts 26 are placed through the apertures and secured with nuts and washers from the underside of vehicle 10. Base 20 is now permanently affixed to the vehicle, and provides for a consistent and secure location for the installation of enclosure 30.

Figure 3:
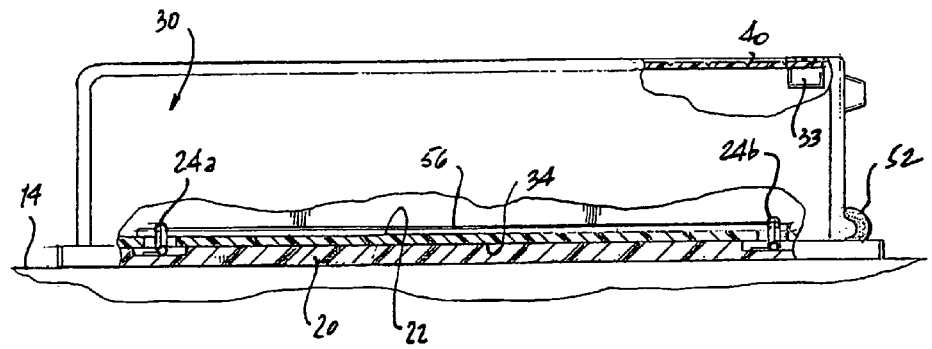
FIG. 3 is an elevation, partial cutaway view of the assembled enclosure and base platform shown in FIG. 1, illustrating the securement means contained within the interior.

Turning now to FIG. 3, enclosure 30 is installed on base 20 within interior compartment 12. Because of the inboard installation of wheels 52, lower most surface 34 is in full contact with base 20, and upstanding rings 24a and 24b are visible through the cutaway wall. A case-hardened steel bar 56 passes simultaneously through the rings to secure enclosure 30 to base 20. An enclosure 33 is located at the base of door 40, and contains means for securing the door in its closed position, such as an electronic or mechanical lock.

Figure 4:
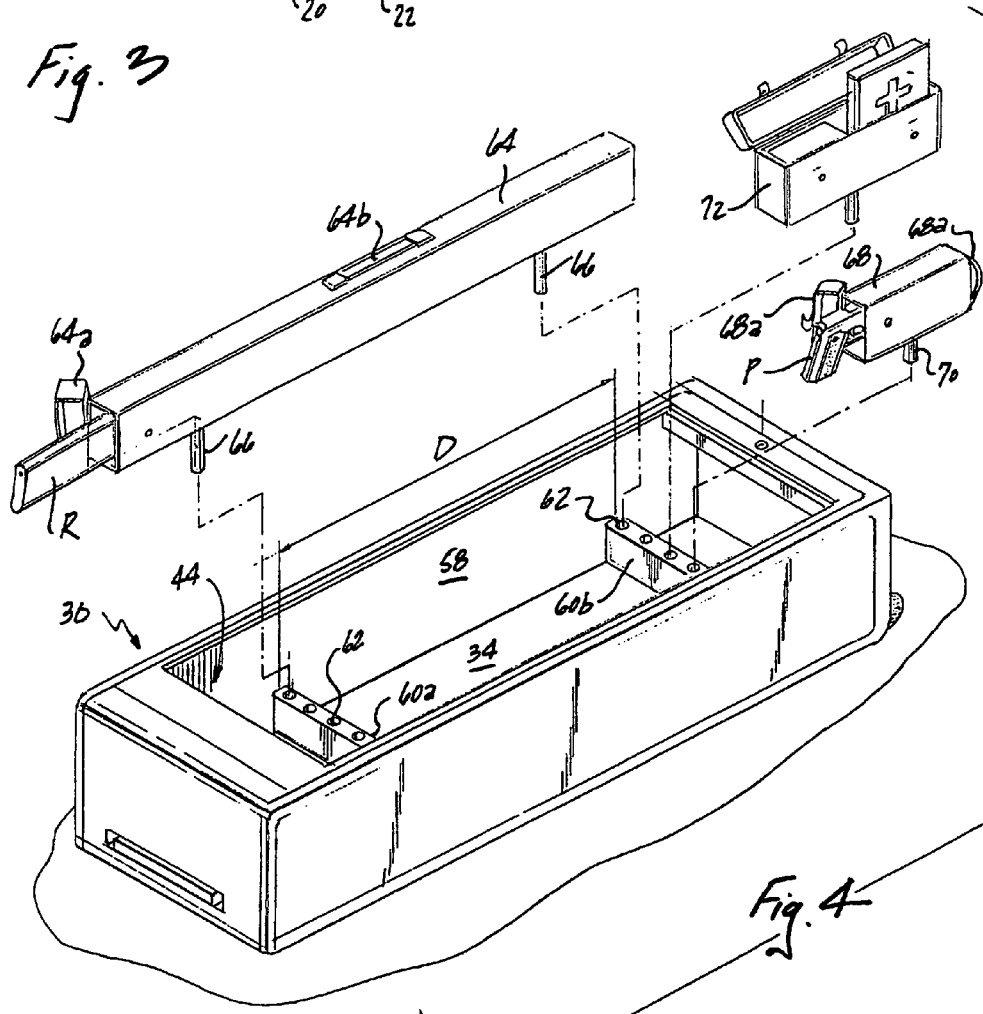
FIG. 4 is an exploded perspective view of the interior components and accessories of the portable enclosure.

The interior details of enclosure 30 are best seen in FIG. 4. Enclosure 30 is shown as removed from vehicle 10, such as in a garage, command center, arsenal, etc. Door 40 has been retracted within opening 44. Interior compartment 58 is visible, containing two rack members 60a and 60b. Rack members are spaced apart at an optimum dimensional distance, as shown by dimension line "D". A plurality of apertures 62 is contained on the top surfaces of the racks. The racks are permanently affixed to the lower most surface 34 of enclosure 30 by any conventional means, such as sonic welding, riveting or the like. An optional third rack might be installed, depending on the type and weight of the firearms to be transported.

A long pod 64 is shown for containment of rifle "R". A cover 64a is shown at the open end of the pod, and a handle 64b is centered on the top surface of the pod. Pins 66 depend from the lower surface of the pod, and are dimensioned to fit into apertures 62 of racks 60a and 60b. Pins may be tubular or solid members, and are frictionally retained within the apertures. Alternate retention means may be contemplated, such as spring clips, mechanical locks, and the like.

A smaller pod 68 is also shown, containing pistol "P". Similar to the longer pod, a cover 68a, a handle 68b, and a pin 70 are included. An alternate pod 72 is also shown for storage of sundries such as medical kits, ammunition magazines, handcuffs, and the like.

Depending on the quantity of firearms required for a specific operation, any open space within enclosure interior 58 can be filled with additional gear and apparel such as vests, helmets, goggles, and the like. Upon closing and locking of door 40, all requisite gear and firearms is contained within enclosure 30 and is easily transported to and from vehicle 10, and selectively accessed at the discretion of the agents.

Figure 5:
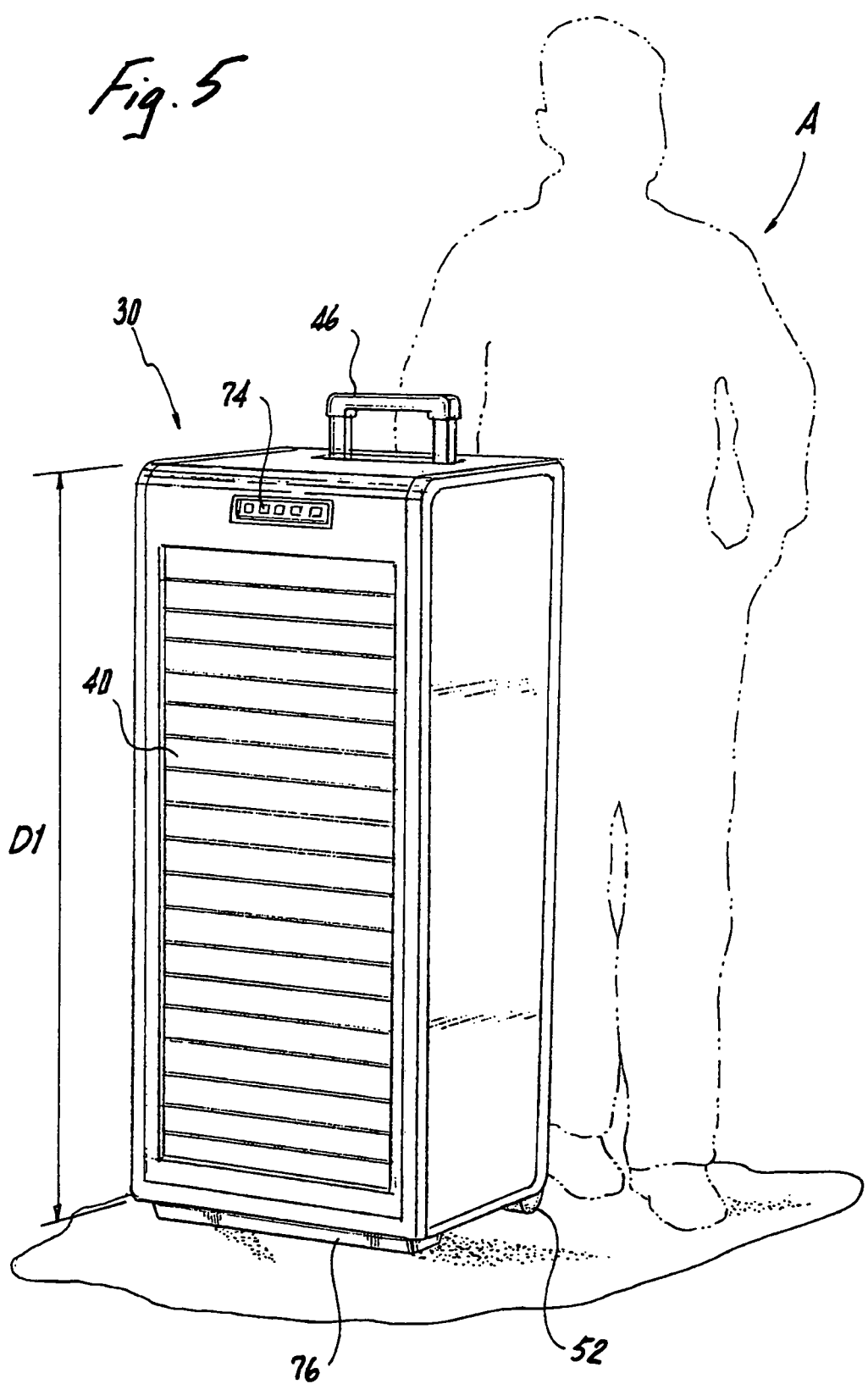
FIG. 5 is a perspective view of the enclosure in its upright orientation with handle deployed.

FIG. 5 shows the enclosure 30 removed from the vehicle and in its upright position, in preparation for rolling on wheels 52. Handle 46 is deployed for use by agent "A", and an electronic locking means containing a tactile keypad 74 is shown for securing of door 40. It is noted that the height of the enclosure case, as seen at dimension line "Dl", is dictated on a custom basis by the length of the firearms to be contained within. For example, an operation in which a shorter firearm such as a submachine gun is desired, a shorter enclosure with a longer handle can be utilized. As is evident, this shorter shorter enclosure with a longer handle can be utilized. As is evident, this shorter enclosure may still be installed on standard base 20 within the vehicle, as rings 24a and 24b are permitted to pass through the lower most surface of the shorter enclosure. A bumper 76 can be integrally molded to enclosure 30, or attached via screws to insure stability of the enclosure in its upright position.

Figure 6:
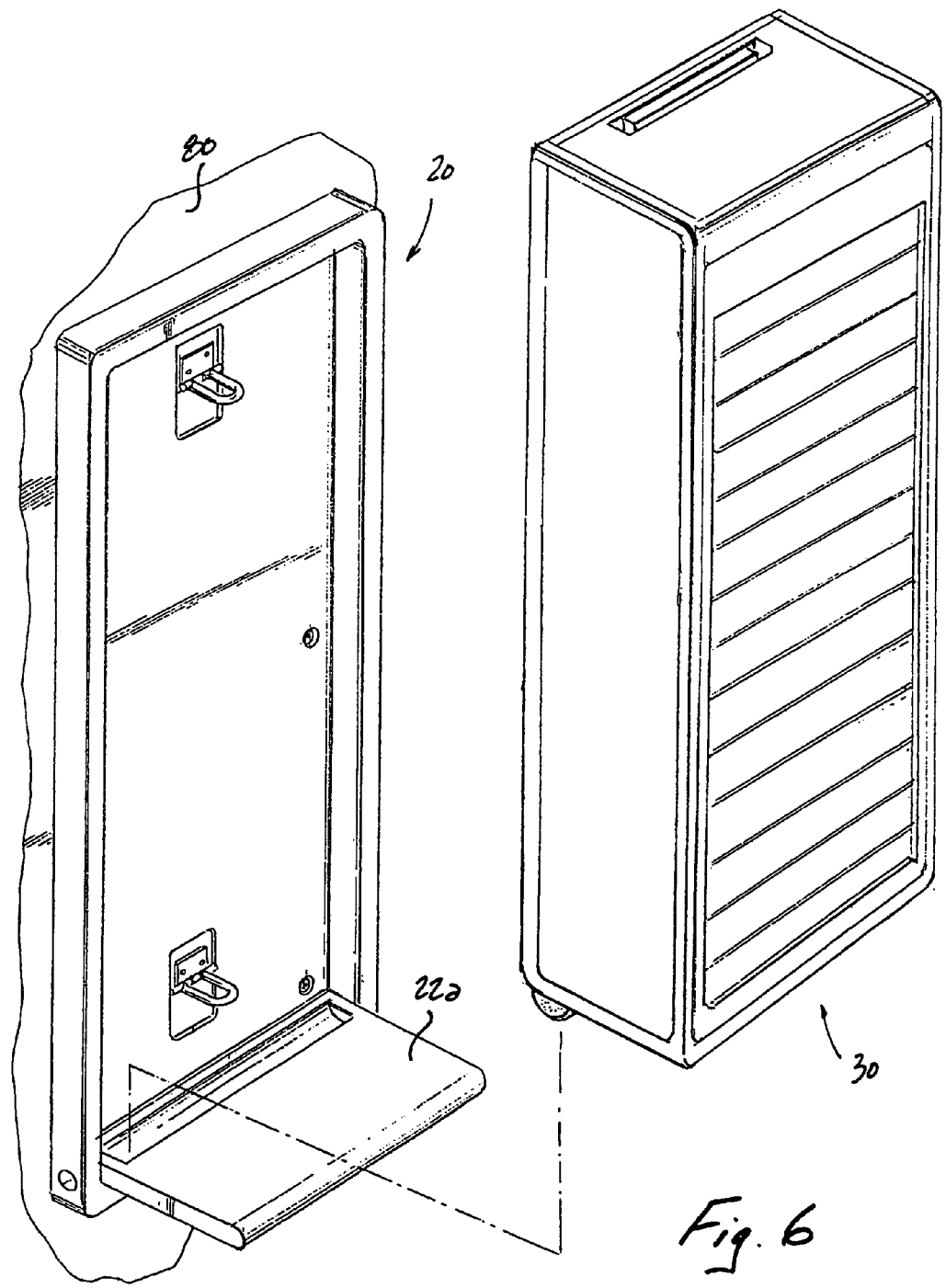
FIG. 6 is a perspective exploded view of the enclosure adjacent a wall mounted base platform.

FIG. 6 shows mounting enclosure 30 to base 20 in a vertical position. In this situation, base 20 is mounted to vertical wall 80, which may be a boat bulkhead, an internal wall of a step van, or in a garage. Base 20 includes hinge mounted shelf 22a, which serves to support enclosure 30 during installation onto base.

While only a limited number of preferred embodiments of the present invention have been disclosed for purposes of illustration, it is obvious that many modifications and variations could be made thereto. It is intended to cover all of those modifications and variations which fall within the scope of the present invention, as defined by the following claims.

I claim:

1. A portable security enclosure assembly for use with a vehicle of the type having a surface, said assembly comprising: a base, an enclosure, means for fixing said base to the vehicle surface, means for detachably mounting said enclosure to said base, said mounting means comprising first and second rings pivotally mounted on said base surface for movement between an upright position and a non-upright position, said rings being spaced apart a given distance; said enclosure having first and second openings adapted to align with said rings, respectively, when said enclosure is situated on the base, such that said rings extend through said openings in said enclosure when said rings are in said upright position; a locking bar longer than said given distance and adapted to be simultaneously received through said rings, so as to secure said enclosure to said base; and closure means for covering said openings in said enclosure when said enclosure is removed from said base.

2. The enclosure of claim 1 wherein said means for fixing said base to the vehicle surface comprises a plurality of spaced bolts.

3. The enclosure of claim 1 further comprising first and second wheels mounted to one side of said enclosure.

4. The enclosure of claim 3 further comprising a handle mounted on another side of said enclosure.

5. The enclosure of claim 4 wherein said wheels and said handle are situated on opposite sides of said enclosure.

6. The enclosure of claim 4 wherein said handle is retractable.

7. The enclosure of claim 5 wherein said enclosure is adapted to stand upright on said wheels when said enclosure is removed from the vehicle.

8. The enclosure of claim 3 further comprising a bumper mounted to said one side of said enclosure.

9. The enclosure of claim 1 further comprising a rack member, a firearm containment pod and means for detachably mounting said pod on said rack member.

10. A security enclosure assembly for use with a vehicle, said enclosure comprising: first and second opposing surfaces, means for affixing one of said enclosure surfaces to the vehicle, said means comprising first and second rings pivotally mounted on said base surface for movement between an upright position and a non-upright position, said rings being spaced apart a given distance; said enclosure having first and second openings adapted to align with said rings, respectively, such that said rings extend through said openings in said enclosure when said rings are in said upright position; and a locking bar longer than said given distance and adapted to be simultaneously received through said rings, so as to secure said enclosure to said vehicle; a door in said other of said enclosure surfaces to permit access to the interior of said enclosure; closure means for covering said openings in said enclosure when said enclosure is removed from said base; means for locking said door in the closed position; a first rack member mounted on and extending from said one enclosure surface into the interior of said enclosure; a firearm containment pod; and means for detachably mounting said pod to said first rack member.

11. The enclosure of claim 10 wherein said pod mounting means comprises a pin and a pin-receiving recess.

12. The enclosure of claim 10 wherein said pod has an open end and further comprising a cover for said open end.

13. The enclosure of claim 10 further comprising a second rack member, mounted on and extending from said one enclosure surface, at a location spaced from said first rack member.

14. The enclosure of claim 13 further comprising second means for detachably mounting said pod on said second rack member.

15. The enclosure of claim 14 wherein said second mounting means comprises a pin and a pin-receiving recess.

16. The enclosure of claim 10 further comprising a second firearm containment pod, wherein said second pod has an open end and a cover for said open end.

17. The enclosure of claim 10 wherein said pod is adapted to hold a pistol.

18. The enclosure of claim 16 wherein said second pod is adapted to hold a rifle.

19. The enclosure of claim 10 further comprising a pod adapted to hold medical supplies.

20. The enclosure of claim 10 wherein said door is segmented.

21. The enclosure of claim 10 wherein said door is a roll-up door.

* * * * *